United States Patent

Hutton et al.

[15] 3,639,170
[45] Feb. 1, 1972

[54] LACTOSE PRODUCT AND METHOD

[72] Inventors: Jerry T. Hutton, Glen Ellen; Gaylord M. Palmer, Castro Valley, both of Calif.

[73] Assignee: Foremost-McKesson, Inc., San Francisco, Calif.

[22] Filed: May 1, 1970

[21] Appl. No.: 33,704

Related U.S. Application Data

[63] Continuation-in-part of Ser. No. 393,877, Sept. 2, 1964, abandoned.

[52] U.S. Cl. ................................. 127/31, 99/199, 99/203, 127/58, 127/61
[51] Int. Cl. .......................................................... C13k 5/00
[58] Field of Search ................... 127/31, 58, 60, 61; 99/199, 99/203

[56] References Cited

UNITED STATES PATENTS

| | | | |
|---|---|---|---|
| 2,728,678 | 12/1955 | Sharp | 99/199 |
| 3,533,805 | 10/1970 | Nava et al. | 99/199 X |

Primary Examiner—Morris O. Wolk
Assistant Examiner—Sidney Marantz
Attorney—Flehr, Hohbach, Test, Albritton & Herbert

[57] ABSTRACT

A dry lactose product in the form of spherical granules each consisting of lactose crystals bonded together by lactose in glass form. It has excellent free-flowing properties with relatively high solution rate and good physical stability. Also a method of making the product in which an aqueous slurry of fine lactose crystals is spray dried.

5 Claims, 2 Drawing Figures

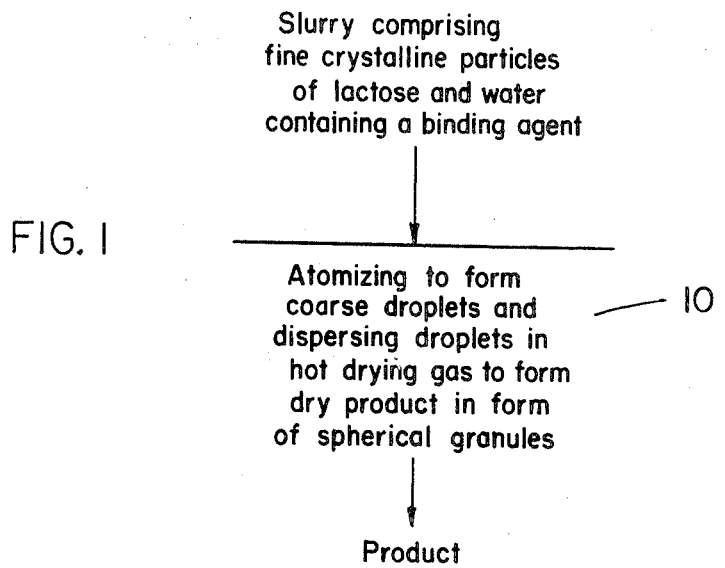
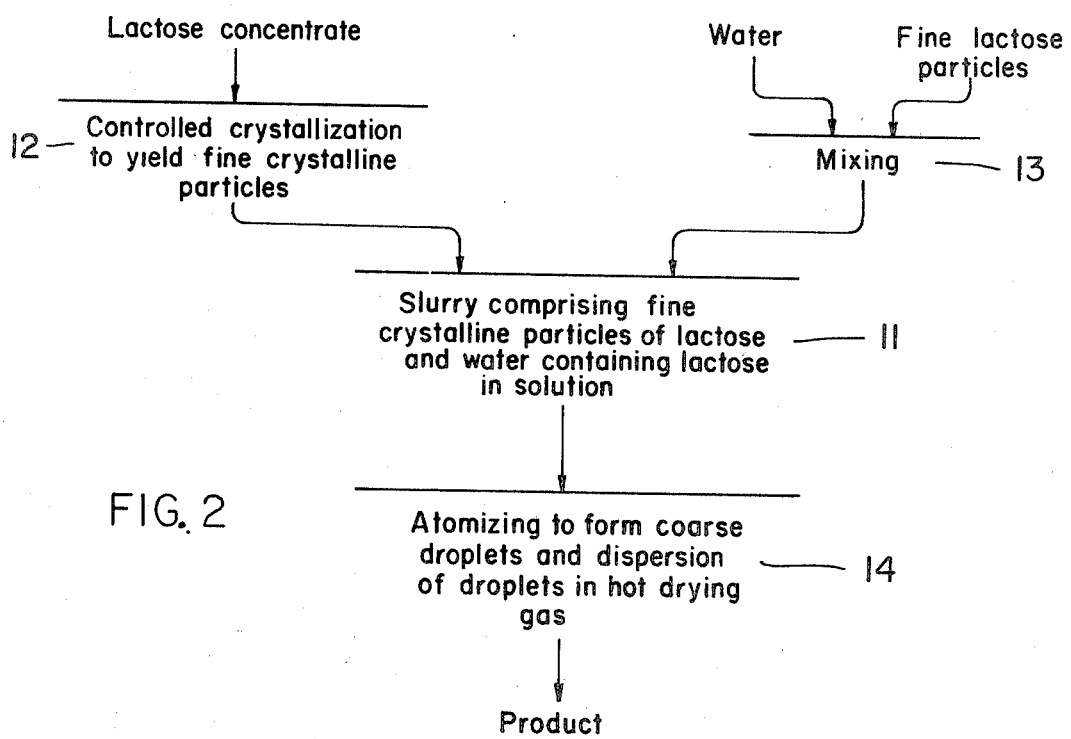

LACTOSE PRODUCT AND METHOD

CROSS-REFERENCE TO COPENDING APPLICATION

This application is a continuation-in-part of our copending application, Ser. No. 393,877 filed Sept. 2, 1964 entitled "Lactose Product and Method," now abandoned.

BACKGROUND OF THE INVENTION

This invention relates to the manufacture of a new physical form of lactose which in bulk has flow characteristics surpassing those of conventional crystalline lactose of comparable particle size while possessing a high dissolution rate comparable to very fine crystalline lactose that is notably very inferior in flow properties.

In many industries and for various applications there is need for dry lactose products that are readily wettable and easily soluble in a liquid medium, and which in addition are free-flowing in bulk. Coarse lactose in crystalline form has a fair flow rate and good physical stability, but the rate of solution in water is relatively slow. Fine lactose powder such as is produced by conventional fine grinding generally has a rapid solution rate but is lacking in good free-flowing properties, while lactose prepared by conventional spray drying either lacks desired flow properties or contains too many large sized lactose crystals to provide rapid solubility by simple agitation in water. Conventional methods for pelletizing or granulating such lactose powder provides good flow properties, but tend to impair the rate of dissolution in water. By the application of so-called instantizing methods, fine lactose powder can be converted to the form of porous aggregates. Such instantized lactose is relatively free-flowing and readily wettable. However, the bulk density is relatively low, due to the porous character of the aggregates. In many instances this is a distinct disadvantage. Also lactose aggregates are subject to crushing during packaging and handling with the result that flowability is impaired.

Certain dry products containing crystalline materials (e.g., sucrose) have been made by seeding an aqueous concentrate of the material followed immediately by spray drying. The purpose is to induce a substantial amount of crystallization of crystallizable ingredients during spray drying. While such seeding may be desirable with certain materials (e.g., nonfat milk concentrate) being fed to a spray dryer, it has been found that when it is applied to lactose and other sugar syrups (e.g., sucrose), the relatively quite slow drying conditions required to permit extensive crystallization promote the growth of excessive numbers of quite large crystals accompanied with fusion and disintegration of a high proportion of the originally spherical forms. Microphotographs of such products show particles having flat sides intersecting in sharp edges and points and numerous essentially free crystals of large size. Such a product does not have free-flowing characteristics as is required for many purposes. If faster drying conditions are employed to preserve the spherical shapes of the particles the extent of crystallization provided is insufficient to reduce the amount of glass to that point required to minimize stickiness of the particles so that the free-flowing properties can be provided.

In general there is a need for a dry lactose product having a high flow rate, high rate of solution in water and good physical stability.

SUMMARY OF THE INVENTION

An object of the present invention is to provide dry lactose products and methods for their manufacture, which are free-flowing in bulk, quickly soluble in an aqueous medium and with a relatively high bulk density and physical stability.

Another object of the invention is to provide a lactose product and method as described above which involves the use of spray drying in a particular manner to form dry granules of spherical form which contain smaller individual crystalline particles of lactose.

Additional objects and features of the invention will appear from the following description in which the preferred embodiments have been set forth in detail in conjunction with the accompanying drawing.

BRIEF DESCRIPTION OF THE DRAWING

FIG. 1 is a flow diagram illustrating the general nature of the method; and

FIG. 2 is a flow diagram illustrating the method more completely as applied to the production of lactose products.

DESCRIPTION OF THE PREFERRED EMBODIMENT

As illustrated generally in FIG. 1, the method involves providing a slurry comprising fine crystalline lactose particles, together with an aqueous liquid medium containing dissolved lactose. The size of crystalline particles should be such that the major portion of the same are substantially smaller in size than the size of the granules forming the final dry product. The binding agent in the aqueous medium preferably is lactose in solution which during drying is converted to lactose glass.

The slurry can be prepared by mechanically intermixing the fine crystalline lactose particles with water under such conditions as to minimize dissolution of the particles and to maintain their physical identity. This involves control over time and temperature factors. Also the slurry can be prepared by controlled crystallization of lactose from a supersaturated solution. The control should be such as to maintain the size of the crystals within the limits desired, as for example by carrying out crystallization with continuous agitation and with temperature control whereby the major portion (e.g., 60 to 85 percent or more) of the lactose in the supersaturated solution is caused to form fine crystals.

In step 10, the slurry of crystalline lactose particles is subjected to a controlled form of spray drying to produce the desired final product. This operation can be carried out by the use of conventional spray drying equipment, utilizing atomizing means in conjunction with a spray drying chamber through which hot drying gas is circulated. The type of atomizing means employed should be such as is capable of handling relatively concentrated slurries to form coarse atomized droplets, with each droplet being of such size that it contains a plurality of the crystalline lactose particles. We have found that both pressure spray and centrifugal atomizing systems may be employed satisfactorily. The particular style and type of atomizer employed should be so selected as to provide atomization of relatively concentrated slurries into droplets of the desired mean diameter and size range. By way of examples, centrifugal atomizers of the type disclosed in U.S. Pat. Nos. 3,095,149 and 2,814,527, and a pressure nozzle of the type manufactured by the Spraying Systems Company under the trade name "WhirlJet," have been used successfully.

The drying conditions within the spray drying chamber are controlled in such a manner as to provide the desired moisture content in the final product. For a particular piece of equipment, and for a given amount of material being supplied to the atomizer, drying conditions can be adjusted by varying the amount of the drying gas supplied, and by adjusting the inlet gas temperature. In general the gas flow rates and the inlet gas temperature can be adjusted to provide maximum drying capacity, without however causing any heat injury to the product. For example the inlet gas temperature may range from about 300° to 400° F.

The final free moisture content of the product can be relatively low, such as about 0.5 or 0.6 percent. Such a product may be packed in moisture proof containers to prevent absorption of atmospheric moisture.

In the rapid conversion of atomized droplets to a dry product, the binding agent (e.g., lactose) is solidified in noncrystalline or glass form whereby it cements or bonds together the solid particles in each of the dried granules.

Assuming proper control in the spray drying operation 10, the final product is in the form of a granular material, each granule being substantially spherical in form. Each granule is composed of a plurality of the crystalline lactose particles firmly bonded or cemented together by lactose in glass form, the crystalline particles comprising the major substance of the product. In typical instances the major part of the fine crystalline lactose particles employed have a size ranging from approximately 1 micron to approximately 100 microns. The major part of the granules of the final product are of a size ranging from approximately 80 microns to approximately 400 microns. The granules are substantially nonporous in that they have substantially no voids within their spherical form.

When a quantity of the product is introduced into water, the granules disintegrate rapidly and each crystalline lactose particle dissolves quickly with a minimum amount of agitation. Because of its granular form, with the granules conforming to spheres, the product is free-flowing. For many industrial and consumer applications this is a desirable characteristic. It facilitates handling of the product in automatic equipment, as for example where the product is measured out and introduced into packages or fed into high-speed tableting equipment. It also facilitates consumer use in that the product can be marketed in simple packages provided with a pour spout.

The bulk density of the final product is relatively high and compares closely with the bulk density of the fine lactose particles before processing. Thus in typical instances the bulk density may range from 0.65 to 0.75 grams per milliliter, whereas the lactose product used in preparing the slurry may have a bulk density in dry form ranging from 0.70 to 0.80 grams per milliliter. A feature of the invention is that although the bulk density may be reduced moderately, the dispersibility in water and flow characteristics have been dramatically improved.

FIG. 2 is a flow sheet illustrating application of the method to crystalline lactose. As indicated at 11, an aqueous slurry is prepared consisting essentially of fine lactose particles together with native lactose syrup. This slurry can be prepared in either one of two ways, or both. Thus a lactose concentrate can be prepared by vacuum evaporation, after which the concentrate is subjected to controlled crystallization in step 12 to yield a slurry consisting of fine lactose crystals and native lactose syrup. By way of example, the lactose concentrate may have a solids content of the order of 60 to 65 percent or more at a temperature within the range of 150° to 175° F. Controlled crystallization in step 12 can be carried out by cooling with agitation to a temperature of from 85° to 110° F. and seeding with approximately 1 percent by weight of the lactose solids of fine lactose seed crystals having an average size of approximately 5 microns. Upon completion of the crystallization cycle, the major proportion of the lactose in the slurry is in the form of crystals ranging in size from 50 to 100 microns. Preferably the slurry should have at least 60 percent or more of its lactose content in the form of fine crystalline particles. In practice it is satisfactory to carry out controlled crystallization until from 75 to 85 percent or more of the lactose content is in crystal form, and it is this slurry which is supplied to the spray drying operation.

Instead of employing controlled crystallization, one may prepare fine particles of crystalline lactose by other methods, as for example by grinding coarser lactose material. In step 13 the fine particles are rapidly intermixed with water to form a homogenous slurry which is then supplied to the atomizer used in the spray drying operation. During the intermixing step 13 and before the slurry is supplied to the atomizer, a small amount of the lactose is dissolved in the water to form the binding medium. Therefore at the time the slurry is supplied to the atomizer, from 80 to 90 percent or more of the lactose content is in the form of fine crystals, with the remainder being dissolved in the water content.

In step 14 the slurry is subjected to atomization and reduced to dry granular form in the same manner as described with reference to FIG. 1. The atomized particles of slurry before drying likewise have about the same portion of their lactose content in the form of crystalline particles. The granular particles of the final product are spherical in form, each comprising a plurality of fine crystalline lactose particles bonded or cemented together by glass resulting from solidification of the lactose content present in dissolved form in the slurry. The amount of such lactose in glass form in the final product is dependent upon the amount of dissolved lactose present in the original slurry. Essentially, no further crystallization takes place during spray drying in step 14.

The lactose product produced as described above possesses the characteristics previously described. In bulk the product is free-flowing, surpassing the flow properties of comparably coarse individual crystals of lactose but with dissolution rate comparable to very finely crystalline lactose. In typical instances the bulk of the spherical granules range in size ranging from 80 to 250 microns. The bulk of the fine lactose particles present in the spherical granules have a particle size substantially the same as in the initial slurry. The product readily dissolves in water with minimum agitation. The product has a bulk density of the order of from 0.55 to 0.75 grams per milliliter and a free moisture content of the order of 0.5 or 0.6 percent and a total moisture content of the order of 5.5 percent or less. The granules are relatively nonporous in that they have substantially no voids within their spherical forms.

An example of the invention is as follows:

The source material was lactose manufactured from whey. It analyzed 99.00 percent lactose, 0.4 percent free moisture, 0.3 percent ash and 0.5 percent protein nitrogen. An aqueous concentrate of this lactose sugar was prepared containing 63 percent solids. This concentrate was subjected to controlled crystallization by cooling the concentrate over a temperature gradient ranging from 155° to 85° F., over a period of about 1 minute, with application of continuous agitation. Agitation was continued over a period of approximately 2½ to 3 hours at which time about 75 percent of the lactose was crystallized in the form of fine crystals, the major part of which had a particle size ranging from about 50 to 100 microns. This slurry was fed to a centrifugal atomizer of a spray dryer, the atomizer being constructed in accordance with U.S. Pat. No. 3,095,149 and operating at a peripheral speed of approximately 450 feet per second. The temperature of the hot air supplied to the spray drying chamber was about 325° F. The gas flow at that temperature was such that the atomized material was reduced to a dry granular product having a free moisture content of 0.6 percent. The final product, when examined under a microscope, was found to be in the form of spheres, each of which could be seen to be comprised of a plurality of separate crystal lactose particles bonded together by lactose in glass form. A screen analysis of the final product was as follows:

| through 20 mesh on 42 mesh | trace |
| through 42 mesh on 60 mesh | 0.5% |
| through 60 mesh on 80 mesh | 7.8% |
| through 80 mesh on 100 mesh | 21.8% |
| through 100 mesh on 140 mesh | 36.3% |
| through 140 mesh on 200 mesh | 21.4% |
| through 200 | 12.2% |

The product in bulk was free-flowing and had a density of 0.7 grams per milliliter. When 10 grams of this granular product was deposited upon 2,000 cc. of 40° F. water in a 2.5 liter beaker, it immediately wet and sank to the bottom of the glass, and simple stirring with a spoon served to effect complete dissolution within a period of about 60 seconds. Tests demonstrated that the granules were relatively nonporous and had substantially no voids. Also they were relatively strong and resisted physical breaking or disintegration during handling, packaging or storage.

It will be evident from the foregoing that our invention provides a new lactose product which is free-flowing in bulk, readily wettable and quickly soluble in water. It has a relatively high bulk density when compared to instantized lactose, and the granules remain as such without tending to break up into irregular crystalline particles.

With respect to the method, it does not involve any substantial amount of crystallization during spray drying or immediately thereafter, and the product is produced with a low free moisture content.

We claim:

1. A spray dried lactose product comprising spherical shaped granules that are relatively nonporous in that they do not have any substantial inner voids, each granule consisting essentially of lactose, the major part of the lactose being in the form of fine lactose crystals that are smaller than the size of the granules, the remaining part of the lactose being in glass form, the lactose crystals comprising the major part of the lactose of each granule and being bonded together by the lactose glass, said product being free-flowing in bulk and relatively rapidly soluble in water and having a bulk density of about 0.55 to 0.7 grams per milliliter.

2. A product as in claim 1 in which most of the lactose crystals range in size from about 50 to 100 microns, and in which most of the granules range in size from about 80 to 250 microns, the crystals of each granule being smaller than the size of the granule.

3. A method for manufacture of a dry granular product consisting essentially of lactose comprising forming a slurry consisting essentially of solid crystalline particles of lactose dispersed in water containing lactose in solution, the crystalline particles comprising from 60 to 85 percent or more of the lactose content of the slurry, atomizing the slurry to form atomized droplets, and causing the droplets to be dispersed in hot drying gas to convert the same to dry nonporous spherical shaped granules, the lactose in solution solidifying in glass form upon drying and serving to bond together said crystalline particles of said slurry in said dry spherical shaped granules.

4. A method as in claim 3 in which most of the solid crystalline particles of lactose have a size of the order of from 1 micron to 100 microns, and in which most of the granules have a size of the order of from 80 microns to 250 microns, the solid particles in each granule being smaller than the granule size.

5. A method as in claim 3 in which the slurry is at a temperature of from 85° to 110° F. at the time it is atomized.

* * * * *